No. 612,569. Patented Oct. 18, 1898.
J. G. MOSCROP.
ECRASEUR.
(Application filed Jan. 15, 1898.)
(No Model.)
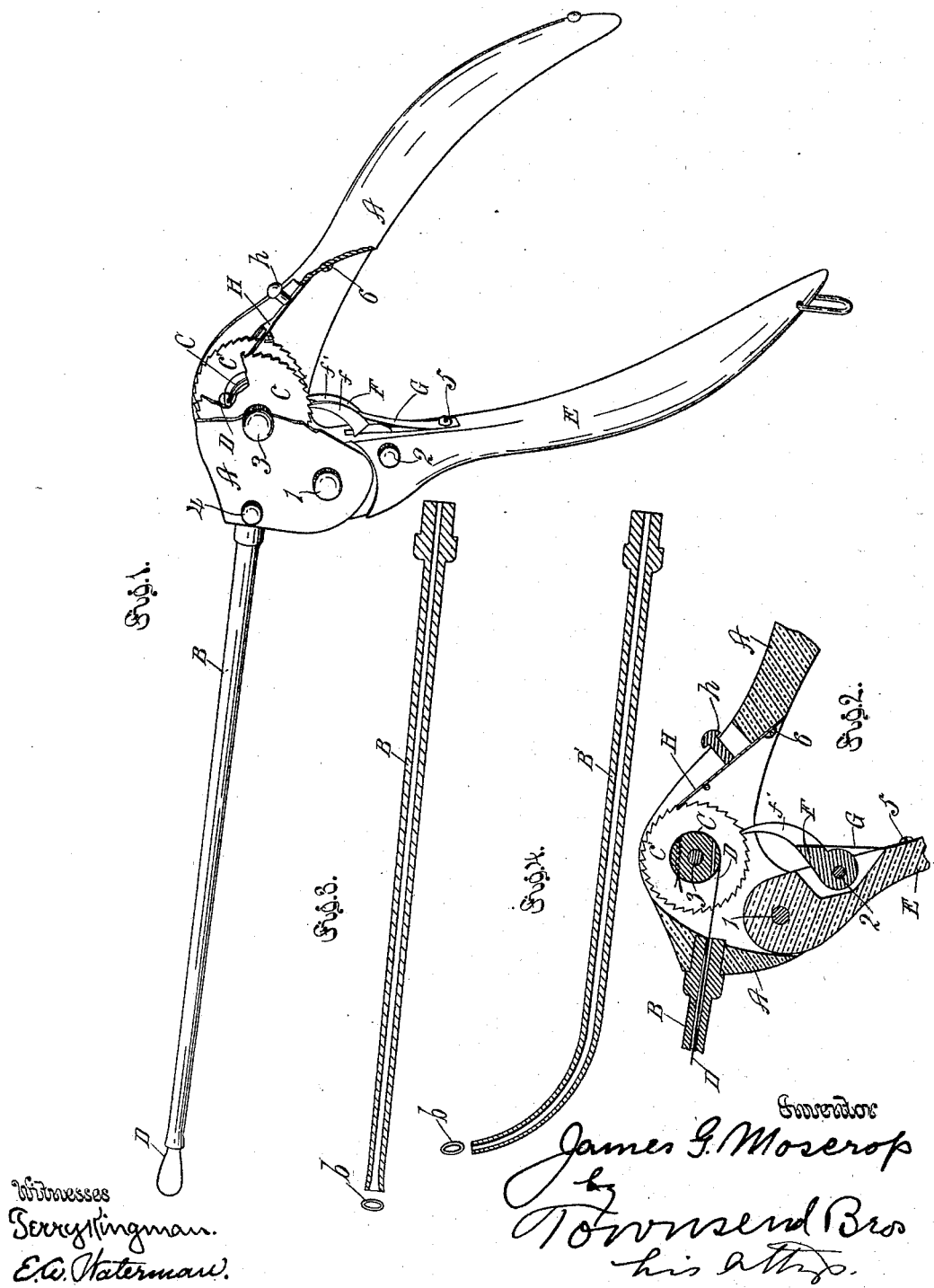

UNITED STATES PATENT OFFICE.

JAMES G. MOSCROP, OF SAN BERNARDINO, CALIFORNIA.

ECRASEUR.

SPECIFICATION forming part of Letters Patent No. 612,569, dated October 18, 1898.

Application filed January 15, 1898. Serial No. 666,821. (No model.)

*To all whom it may concern:*

Be it known that I, JAMES G. MOSCROP, a citizen of the United States, residing at San Bernardino, in the county of San Bernardino and State of California, have invented a new and useful Improvement in Ecraseurs, of which the following is a specification.

The object of my invention is to provide an ecraseur which will be more easily and effectively operated with one hand than former ecraseurs.

An object of my invention is to provide for holding the ecraseur with one hand and at the same time bringing the fingers of the hand into position for operating the drum-driving handle to wind the snare. I also provide for throwing the movable handle and the drum-operating dog with a single spring fastened to the movable handle.

My invention comprises an ecraseur consisting of an ecraseur-tube-carrying handle having journaled thereon a snare-winding axle or drum with a ratchet-wheel thereon and a movable handle pivoted to the under side of the tube-carrying handle and provided with a dog to operate the ratchet, whereby the tube-carrying handle can be grasped between the thumb and palm of the hand and thereby firmly held for directing the tube to the place required and held perfectly still while the fingers of the hand are operating the movable handle, and in this way the strength of all the fingers of the hand can be exerted for winding the snare.

My invention also includes an ecraseur-tube having an oval hole at the mouth, so as to hold the wire loop of the snare in a given plane, so that it can readily be brought into place around the part to be severed. A further advantage gained by the oval mouth is that the loop fits it closely and thus severs the tissues without drawing them into the tube.

My invention also includes other features hereinafter described and claimed.

The accompanying drawings illustrate my invention.

Figure 1 is a perspective view of my ecraseur with portions broken away for clearness of illustration. Fig. 2 is a fragmental longitudinal mid-section. Fig. 3 is a longitudinal section of one form of tube with an elevation showing the oval mouth. Fig. 4 is a longitudinal section and end elevation of the post-nasal form of tube, showing the oval mouth.

A indicates the handle carrying the ecraseur-tube B.

C indicates the snare-winding axle or drum, provided at each end with a ratchet-wheel $c$ $c'$ and journaled in said handle with its periphery in line with the axis of the bore of the tube, so that the snare D extends direct from the periphery of the drum or axle through the tube. The main body of the drum or axle is above the axis of the tube.

E indicates a handle pivoted to the under side of the tube-carrying handle A.

F indicates a dog having two limbs or members $f f'$ and pivoted to said pivoted handle and projecting upward and engaging said ratchet-wheels. The axle, with its two ratchet-wheels, and the dog, with its two limbs, form a unitary dog and ratchet for winding the snare.

G indicates a spring fixed to the pivoted handle and engaging the dog to force the dog against the ratchet and at the same time to force the free end of the pivoted handle away from the tube-carrying handle which carries the ratchet-wheels.

$h$ indicates an upwardly-projecting handle for withdrawing the spring-pressed pawl H away from the ratchet-wheels to allow the snare to unwind from the drum.

In practical operation the tube-carrying handle A will be grasped between the thumb and palm of the hand of the operator, and the fingers will then be brought beneath the pivoted handle E. The tube will be inserted to the desired point and the snare brought into the operative position, and thereupon the operator will operate the handle E by means of his fingers and will draw the free end of the handle E toward the handle A, thus forcing the dog F upward and rotating the drum to wind the snare thereupon. If more than one movement of the handle E is required, the fingers will relax to release the handle E, and the spring G immediately forces the free end of the pivoted handle away from the other handle A and at the same time the pawl H holds the drum from rotating to release the snare. Another movement of the fingers will again operate the handle E, and the operation will be continued until the part to be removed has been severed. This can be done very quickly and great force exerted, if required. Then the instrument is removed and the operator will release the snare by pulling upon the handle *h* with the thumb. There is space enough left in the handle for the spring-pawl H to be readily drawn away from its engagement with the ratchet-wheels.

In order to readily ascepticise the instrument, the parts are fastened together by screws 1 2 3, each of which is provided with a milled head, so as to be readily operated by the thumb. The screw 1 pivots the handle E to the handle A. The screw 2 pivots the dog F to the handle E. The screw 3 is the pivot upon which the axle or drum rotates. This pivot is screw-threaded at one end outside of the bearing for the axle, and such screw-threaded part screws into one cheek of the handle, which is chambered to hold the drum. 4 indicates a thumb-screw for clamping the ecraseur-tube. 5 is a screw for holding the spring G, and 6 is a screw for holding the spring-pawl H. B', Fig. 4, indicates the postnasal tube. *b* indicates the oval mouths of the several tubes.

Since the muzzle of the tube is flattened or oval, the snare-wire practically fits the same and does not draw the tissue of the parts to be severed into the tube, but crushes it off as the snare enters.

The drum is provided with a ratchet-wheel at each end, so that the power will be exerted equally at each end of the drum, and there will be an equal pressure on both its bearings.

Now, having described my invention, what I claim as new, and desire to secure by Letters Patent, is—

1. An ecraseur comprising a handle carrying an ecraseur-tube; a snare-winding axle provided at each end with a ratchet-wheel and journaled in said handle with its periphery in line with the bore of the tube; a dog pivoted to said pivoted handle and projecting upward and engaging said ratchet-wheels; a spring fixed to the pivoted handle and engaging the dog to force the dog against the ratchet and to force the free end of the pivoted handle away from the tube-carrying handle; and a spring-pressed pawl mounted on the tube-carrying handle to engage the ratchet-wheels.

2. An ecraseur comprising a handle carrying an ecraseur-tube; a snare-winding axle provided at each end with a ratchet-wheel and journaled in said handle with its periphery in line with the bore of the tube; a handle pivoted to the under side of the tube-carrying handle; a dog pivoted to said handle and projecting upward and engaging said ratchet-wheels; a spring fixed to the pivoted handle and engaging the dog to force the dog against the ratchet and to force the pivoted handle away from the tube-carrying handle; and a spring-pressed pawl mounted on the tube-carrying handle to engage the ratchet-wheels and provided with an upwardly-projecting handle for withdrawing it from the ratchet-wheels.

3. The combination with a handle carrying an ecraseur-tube and having a snare-winding axle with a ratchet-wheel thereon, of a movable handle pivoted to the under side of the tube-carrying handle and provided with a dog to operate the ratchet, whereby the tube-carrying handle can be grasped between the thumb and palm of the hand while the fingers of the hand are in position for operating the movable handle.

JAS. G. MOSCROP.

Witnesses:
JAMES R. TOWNSEND,
F. M. TOWNSEND.